United States Patent
Katrak et al.

(10) Patent No.: US 7,464,203 B2
(45) Date of Patent: Dec. 9, 2008

(54) METHOD OF VALIDATING PLURALITY OF DATA DURING SERIAL COMMUNICATION USING A DUAL PATH ACROSS A SINGLE SERIAL LINK

(75) Inventors: Kerfegar K. Katrak, Fenton, MI (US); Thomas M. Forest, Macomb Township, MI (US); James K. Thomas, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 179 days.

(21) Appl. No.: 11/460,338

(22) Filed: Jul. 27, 2006

(65) Prior Publication Data

US 2007/0024910 A1 Feb. 1, 2007

Related U.S. Application Data

(60) Provisional application No. 60/703,651, filed on Jul. 29, 2005.

(51) Int. Cl.
*G06F 15/00* (2006.01)

(52) U.S. Cl. .................. 710/70; 710/8; 710/9; 710/10; 710/67; 710/68; 710/69; 701/1; 701/29; 701/34; 358/1.18

(58) Field of Classification Search ............... 710/8–10, 710/67–70; 701/1, 29, 34; 358/1.18
See application file for complete search history.

(56) References Cited

U.S. PATENT DOCUMENTS

| 5,513,107 | A  | * | 4/1996 | Gormley ...................... 701/48 |
| 6,243,629 | B1 | * | 6/2001 | Sugimoto et al. ............. 701/29 |
| 6,799,106 | B2 | * | 9/2004 | Fukushima et al. ........... 701/48 |
| 2005/0033493 | A1 | * | 2/2005 | Eguchi et al. ................. 701/36 |

* cited by examiner

*Primary Examiner*—Tammara R Peyton

(57) ABSTRACT

A method and apparatus is provided for validating a plurality of variable data transmitted in an automobile, comprising generating a control copy and a redundant copy of the variable data, calculating a pre-transmittal cross-check measure using the redundant copy of the variable data, and generating a transmittal message using the control copy of the data and the pre-transmittal cross-check measure.

20 Claims, 4 Drawing Sheets

METHOD OF VALIDATING PLURALITY OF DATA DURING SERIAL COMMUNICATION USING A DUAL PATH ACROSS A SINGLE SERIAL LINK

CROSS-REFERENCE TO RELATED APPLICATION

This application claims the benefit of U.S. Provisional Ser. No. 60/703,651 filed Jul. 29, 2005.

TECHNICAL FIELD

The present invention generally relates to control systems found on automobiles and other vehicles, and more particularly relates to methods and systems for ensuring the security of data processed within a vehicle-based control system.

BACKGROUND OF THE INVENTION

Modern automobiles and other vehicles may include sophisticated on-board computer systems that monitor the status and performance of various components of the vehicle (for example, the vehicle engine, transmission, brakes, suspension, and/or other components of the vehicle). Many of these computer systems may also adjust or control one or more operating parameters of the vehicle in response to operator instructions, road or weather conditions, operating status of the vehicle, and/or other factors.

Various types of microcontroller or microprocessor-based controllers found on many conventional vehicles include supervisory control modules (SCMs), engine control modules (ECMs), controllers for various vehicle components (for example, anti-lock brakes, electronically-controlled transmissions, or other components), among other modules. Such controllers are typically implemented with any one of numerous types of microprocessors, microcontrollers or other control devices that appropriately receive data from one or more sensors or other sources, process the data to create suitable output signals, and provide the output signals to control actuators, dashboard indicators and/or other data responders as appropriate. The various components of a vehicle-based control system typically inter-communicate with each other and/or with sensors, actuators and the like across any one of numerous types of serial and/or parallel data links. Today, data processing components within a vehicle are commonly interlinked by a data communications network such as a Controller Area Network (CAN), an example of which is described in ISO Standard 11898-1 (2003).

Because vehicles may now process relatively large amounts of digital data during operation, it can be an engineering challenge to ensure that the data processed is accurate and reliable. As digital data is stored, processed, consumed and/or shared between or within the various data processing components of a vehicle, for example, bit errors and the like can occur due to environmental factors, hardware faults, data transmission issues and other causes. As a result, various techniques have been developed to ensure the integrity of data processed and transferred within the vehicle. However, because there may be limited space in serial data messages, there is a need for a technique utilizing less message space.

It remains desirable to formulate systems and methods for ensuring data security within vehicle control systems. Other desirable features and characteristics will become apparent from the subsequent detailed description and the appended claims, taken in conjunction with the accompanying drawings and the foregoing technical field and background.

SUMMARY OF THE INVENTION

A method is provided for validating a plurality of variable data transmitted in an automobile. In one embodiment, and by way of example only, the method comprises the steps of generating a control copy and a redundant copy of the variable data, calculating a pre-transmittal cross-check measure using the redundant copy of the variable data, and generating a transmittal message using the control copy of the data and the pre-transmittal cross-check measure.

In another embodiment, and by way of example only, the method comprises the steps of generating a control copy and a redundant copy of the variable data, calculating a pre-transmittal cross-check measure using the redundant copy of the variable data, generating a transmittal message using the control copy of the data and the pre-transmittal cross-check measure, transmitting the transmittal message, and receiving a received message from the transmitted transmittal message. The received message comprises a received data component and a received pre-transmittal checksum.

An apparatus is provided for validating a plurality of variable data transmitted in an automobile. In one embodiment, and by way of example only, the apparatus comprises means for generating a control copy and a redundant copy of the variable data, means for calculating a pre-transmittal cross-check measure using the redundant copy of the variable data, and means for generating a transmittal message using the control copy of the data and the pre-transmittal cross-check measure.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

Figure 1:
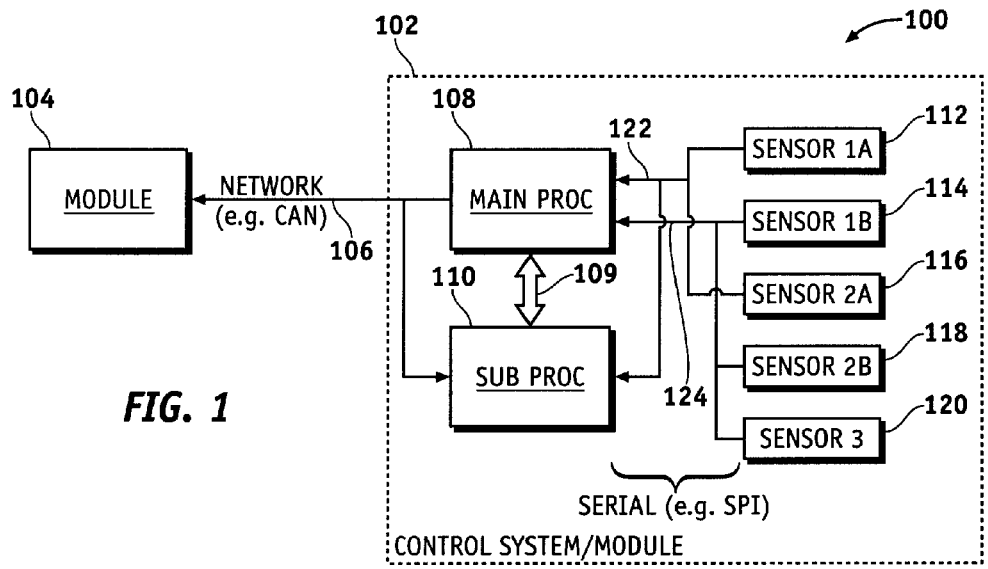
FIG. 1 depicts an embodiment of a control system for processing and/or transmitting data in an automobile.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, various methods and systems are presented for ensuring the integrity, security and/or reliability of data obtained, transmitted and/or processed by a control system. With reference to the FIG. 1, an exemplary control system 100 suitably includes any number of modules 102, 104 that exchange data via a data link 106. In various embodiments, link 106 is a Controller Area Network (CAN) or other data network connection. Modules 102, 104 may be any one of numerous types of systems or devices having any one of numerous types of data processing hardware, such as any one of numerous types of microprocessors or microcontrollers, such as a transmitter 102 and a receiver 104.

Preferably one or more transmitters 102 suitably include any number of redundant processors, such as a main processor 108 and a sub-processor 110, interconnected by a conventional data connection 109 as appropriate. In various embodiments, connection 109 is a UART or other internal connection (e.g. a bus connection) within transmitter 102. The processors 108 and/or 110 may be further configured to communicate with various numbers of sensors 112-120, actuators, indicators or other components as appropriate. Such connections may be provided over any type of serial, parallel, wireless or other data communication medium such as a Serial Peripheral Interface (SPI) connection or the like. In various embodiments described below, sensors 112-120 include various sensors such as primary and redundant sensors for a first variable, namely sensors 112 and 114 (respectively), primary and redundant sensors for a second variable, namely sensors 116 and 118 (respectively), and/or a sensor for a third variable, namely sensor 120. It will be appreciated that the sensors 112-120 can include, by way of example only, inertial sensors, and/or any of numerous different types of sensors. It will also be appreciated that similar concepts could be applied to various other types of sensors, actuators, indicators or other devices that are capable of transmitting or receiving data.

In various embodiments, increased reliability is provided through the use of redundant sensors and data processing. An exemplary logical configuration for transmitting data from sensors 112-120 is shown in FIG. 1. In the embodiment of FIG. 1, sensor data from the primary first variable sensor 112 and the primary second variable sensor 116 can be obtained by both the main processor 108 and the sub-processor 110 via a first serial connection 122, while sensor data from the redundant first variable sensor 114, the redundant second variable sensor 118, and the third variable sensor 120 can be obtained by the main processor 108 via a second serial connection 124. Alternatively, in another embodiment (not depicted), sensor data from the primary first variable sensor 112 and the primary second variable sensor 116 can be obtained by the main processor 108 via the first serial connection 122, while sensor data from the redundant first variable sensor 114, the redundant second variable sensor 118, and the third variable sensor 120 can be obtained by both the main processor 108 and the sub-processor 110 via the second serial connection 124. Similarly, it will be appreciated that various combinations of data values from these and/or other sources can be obtained by the main processor 108 and/or the sub-processor 110.

As shown in FIG. 1, the main processor 108 and the sub-processor 110 are interconnected via the data connection 109, and one or more of the processors (preferably at least the main processor 108) communicates with the receiver 104 via the data link 106. In practice, data from any sensor 112-120 could be provided to any processor 108, 110 or other component through a single serial link, and/or through any number of additional links.

Figure 2:
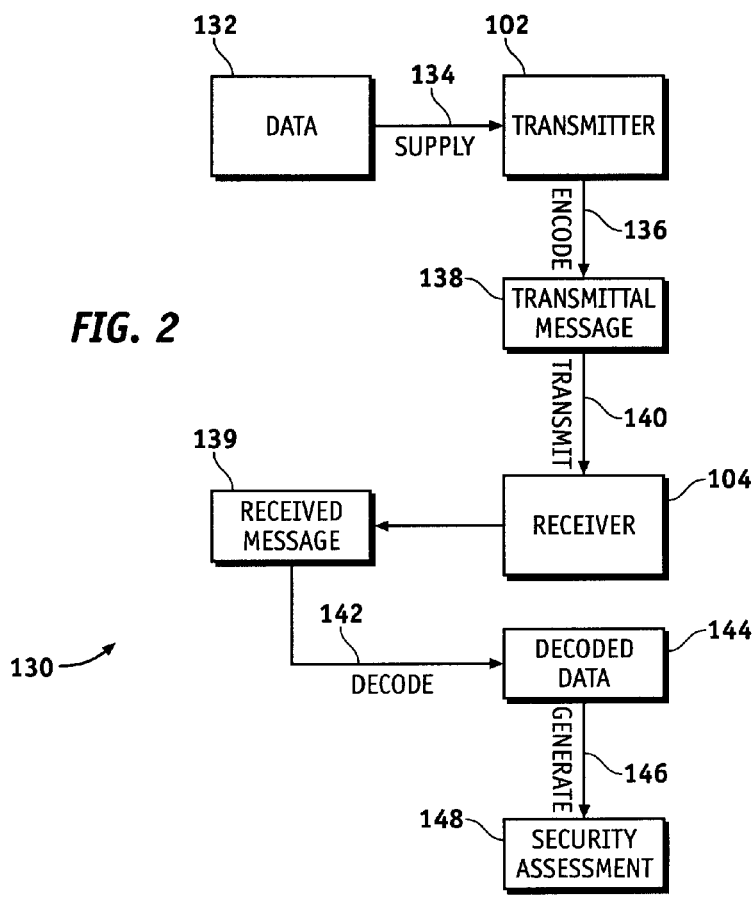
FIG. 2 depicts a method of preserving data transmitted in an automobile.

The security of dual-path information may be preserved even as the data is transmitted from the transmitter 102 across link 106 to the receiver 104 using a data preserving method 130, as set forth in FIGS. 2-5. FIG. 2 provides a general overview of the data preserving method 130. First, data 132 is supplied to the transmitter 102 in step 134. It will be appreciated that the data 132 can be supplied to the transmitter 102 by means of any one of a number of different mechanisms, for example from the sensors 112-120 through the serial connections 122, 124 as set forth in FIG. 1 above, among various other potential mechanisms. Next, in step 136 the transmitter 102 encodes the data 132, generating a transmittal message 138.

Next, in step 140, the transmittal message 138 is transmitted along the link 106 to the receiver 104, where it is received in the form a received message 139. It will be appreciated that the receiver 104 can include any one of a number of different types of modules or other types of receivers. Next, in step 142 the receiver 104 decodes the received message 139, thereby generating decoded data 144. Next, in step 146, the decoded data 144 is used to generate a security assessment 148 of the information received by the receiver 104.

As will be described in greater detail below in connection with FIGS. 3 and 4, the encoding step 136 relates to a technique for encoding data wherein a transmittal message 138 sent across link 106 includes a data component 150 and a transmitted pre-transmittal checksum 152 determined from a redundant path. "Checksum" in this case, and referenced throughout this application, can refer to any sort of parity, cyclic redundancy code (CRC), digest, or other technique for representing the contents of the transmittal message 138.

As will be described in greater detail below in connection with FIGS. 3 and 5, the decoding step 142 preferably includes making a copy of the received message 139, calculating a post-transmittal checksum 154 of the received data component 151 of the received message 139, and comparing the post-transmittal checksum 154 with a received pre-transmittal checksum 181. If the checksums match, data contained within the original and copied data portions can be extracted and compared to each other, further ensuring the integrity of the data prior to use. The original and copied variables extracted from the received message 139 can then be used as dual-path variables for subsequent processing by the receiver 104.

Figure 3:
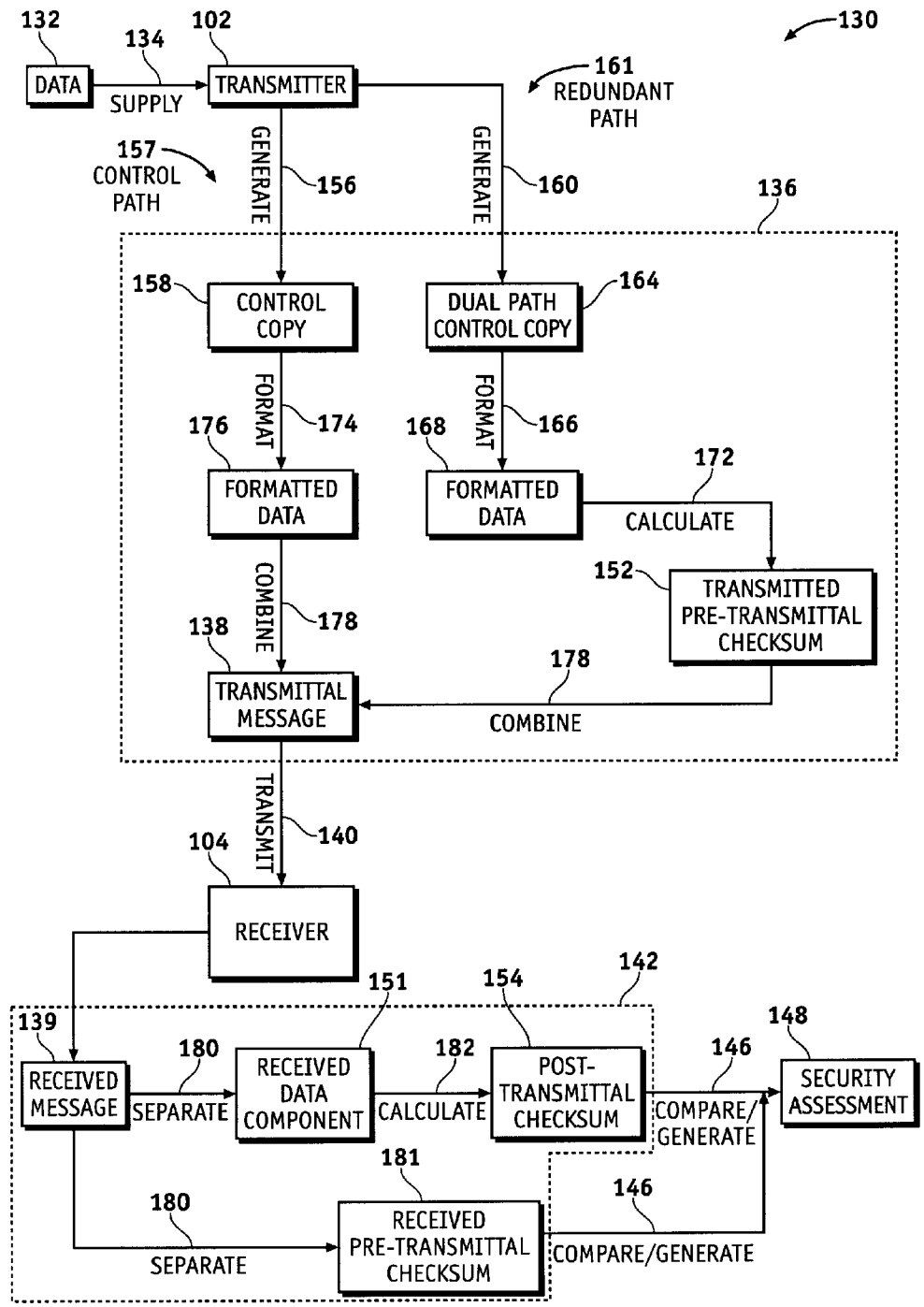
FIG. 3 provides a more detailed depiction of one embodiment of the method of FIG. 2.

FIG. 3 provides a more detailed depiction of various steps of the data preserving method 130. After the data 132 is supplied to the transmitter 102 in step 134, the transmitter 102 then generates, in step 156, a control copy 158 of the data 132 in a control path 157. In addition, in step 160, the transmitter generates a dual path control copy 164 of the data 132 in a redundant path 161. The dual path control copy 164 is formatted in step 166, thereby creating formatted data 168 for the redundant path 161. Then, in step 172, the formatted data 168 of the redundant path 161 is used to calculate the above-referenced transmitted pre-transmittal checksum 152. Meanwhile, in step 174, the control copy 158 of the data 132 is formatted, thereby creating formatted data 176 in the control path 157. Next, in step 178, the transmitted pre-transmittal checksum 152 from the redundant path 161 is combined with the formatted data 176 from the control path 157, thereby generating the transmittal message 138.

Next, in step 140, the transmittal message 138 is transmitted to the receiver 104, preferably via the link 106, where it takes the form of and/or is used to create the received message 139. Next, the receiver 104, in step 180, separates the received message 139 into a received data component 151 and the received pre-transmittal checksum 181. The post-transmittal checksum 154 is calculated from the received data component 151 in step 182, and is then, in step 146, compared with the received pre-transmittal checksum 181, and the security assessment 148 is generated. As depicted in FIG. 3, steps 156, 160, 166, 172, 174, and 178 collectively correspond with the encoding step 136 of the data preserving method 130, while steps 180 and 182 correspond with the decoding step 142, as referenced in FIG. 2. It will be appreciated that certain steps may differ in various embodiments, and/or that certain steps may occur simultaneously or in a different order.

Figure 4:
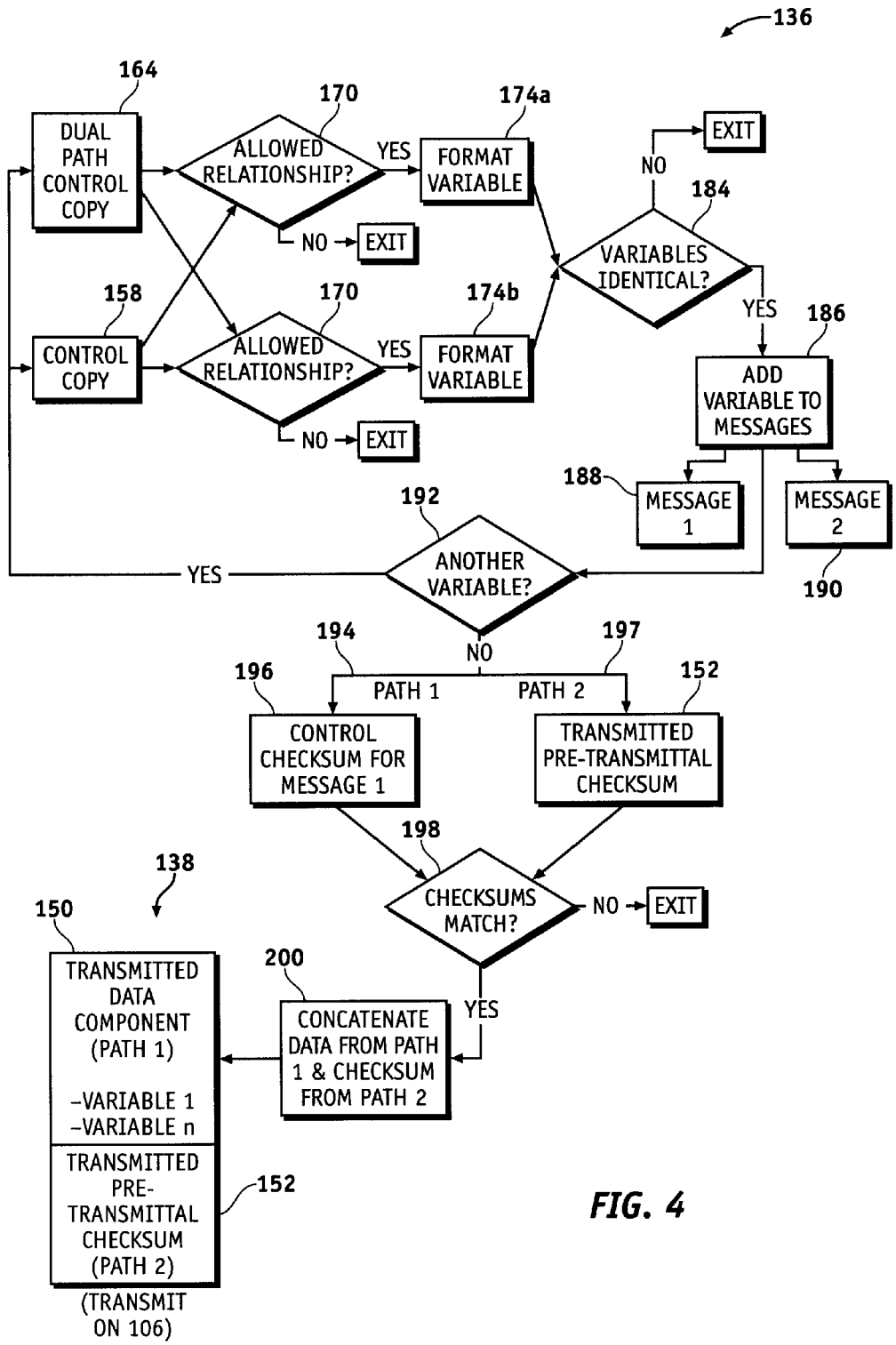
FIG. 4 depicts an embodiment of an encoding step associated with the method of FIG. 2.

For example, FIG. 4 depicts another embodiment pertaining to the encoding step 136, and with reference thereto, will now be described. The control copy 158 and the dual path control copy 164 of the data 132 are compared in step 170, and if these values satisfy an allowed relationship (for example, if the values are similar enough after rounding and/or other data manipulation), then the process continues. Otherwise, the process terminates. In step 174(a) and (b), the control copy 158 and the dual path control copy 164 are both formatted, preferably into CAN format or another suitable format for transmission on link 106.

Next, in step 184, the formatted variables are compared. If these values are unequal, then the process terminates. Otherwise, in step 186, the formatted variables are added to one or more paired messages, such as a control message 188 and a redundant message 190. Preferably, in step 186, the formatted variable values from the control copy 158 and the dual path control copy 164 are not combined together. Rather, preferably the formatted variable values from the control copy 158 are added to the control message 188, and those from the dual path control copy 164 are added to the redundant message 190, in step 186.

Next, in step 192, a check is conducted to determine if there are any additional variables for processing. If so, the process repeats, starting with step 170. Otherwise, the process proceeds to step 194, in which a control checksum 196 is calculated from the control message 188.

Meanwhile, in step 197, the transmitted pre-transmittal checksum 152 is calculated from the redundant message 190. Next, in step 198, the control checksum 196 is compared with the transmitted pre-transmittal checksum 152. If these values are unequal, then the process terminates. Otherwise, in step 200, the data from the control message 188 is concatenated and combined with the transmitted pre-transmittal checksum 152 from the redundant message 190, thereby generating the transmittal message 138. As shown in FIG. 4, the transmittal message 138 preferably includes at least a transmitted data component 150, and the transmitted pre-transmittal checksum 152. The transmittal message 138 is transmitted to the receiver 104 and takes the form of the received message 139, preferably via the link 106 (not shown in FIG. 4).

In the embodiment depicted in FIG. 4, each variable requires a redundant path. However, in various embodiments, there may be certain variables that do not require a redundant path. In such embodiments, the variables requiring a redundant path will preferably be subject to each of the steps set forth in FIG. 4. Meanwhile, certain other variables not requiring a redundant path can skip various steps, such as the creation of a dual path control copy 164, and/or some or all of the steps 170, 174, and 184, and can proceed directly to step 186, in which such variables are added to the messages 188 and 190 along with the variables requiring a redundant path.

Figure 5:
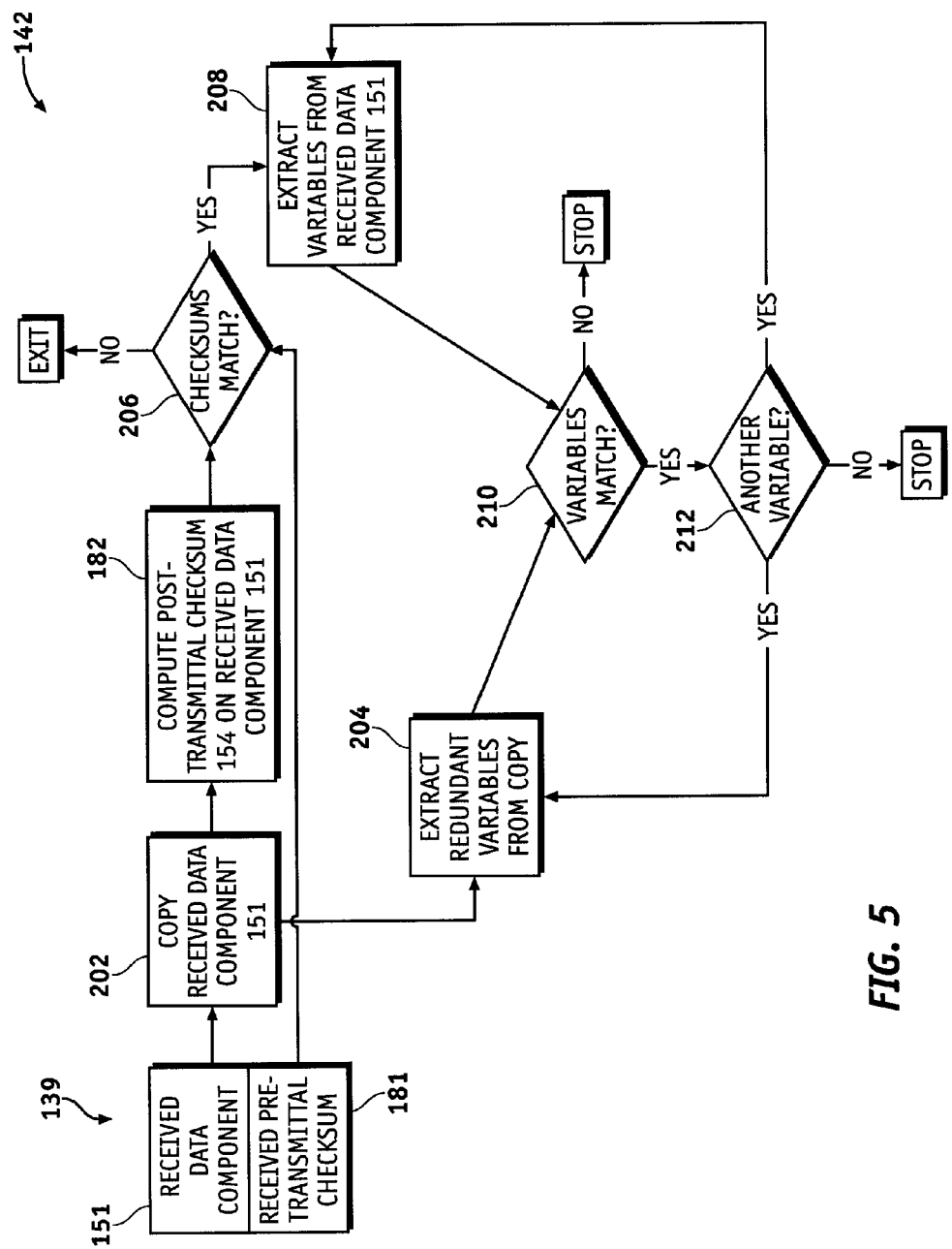
FIG. 5 depicts an embodiment of a decoding step associated with the method of FIG. 2.

Turning now to FIG. 5, an embodiment for the decoding step 142 of the data preserving method 130 is shown. After receiving the received message 139, with the received data component 151 and the received pre-transmittal checksum 181, the receiver 104 (not shown in FIG. 5), in step 202, generates a copy of the received data component 151. Next, in step 204, redundant variables are extracted from the copy created in step 202. Meanwhile, in step 182, the post-transmittal checksum 154 is calculated from the received data component 151. Next, in step 206, the post-transmittal checksum 154 is compared with the received pre-transmittal checksum 181. If the values are unequal, the process stops. Otherwise, in step 208, variables are extracted from the received data component 151. Next, in step 210, the variables extracted in step 204 are compared with the variables extracted in step 208. If these values are unequal, the process terminates. Otherwise, in step 212, the process continues by extracting and comparing any additional variables.

Similar to the discussion above with respect to FIG. 4, it will be appreciated that in various embodiments, there may be certain variables that do not require a redundant path. In such embodiments, the variables requiring a redundant path will preferably be subject to each of the steps set forth in FIG. 5. Meanwhile, certain other variables not requiring a redundant path can skip various steps, such as steps 204, 208, and 210, while still being utilized in the received pre-transmittal checksum 181, the post-transmittal checksum 154, and the comparison therebetween in step 206.

Using the techniques described above, data security and integrity can be increased within an automotive or other data processing system through the use of redundancy and other dual-path techniques. As noted above, the particular techniques described herein may be modified in a wide array of practical embodiments, and/or may be deployed in any type of data collection, control, or other processing environment.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of validating a plurality of variable data transmitted from a transmitter to a receiver across a serial communications medium in an automobile, the method comprising the steps of:
   generating a control copy and a redundant copy of the variable data at the transmitter;
   calculating a pre-transmittal cross-check measure using the redundant copy of the variable data at the transmitter; and
   generating a transmittal message at the transmitter using the control copy of the data and the pre-transmittal cross-check measure calculated using the redundant copy of the variable data; and
   after generating the transmittal message, transmitting the transmittal message to the receiver across the serial communications medium to the receiver.

2. The method of claim 1, further comprising the step of:
   receiving a received message based at least in part on the transmitted transmittal message, the received message comprising a received data component and a received pre-transmittal cross-check measure.

3. The method of claim 2, further comprising the steps of:
   calculating a post-transmittal cross-check measure using the received data component; and
   comparing the calculated post-transmittal cross-check measure with the received pre-transmittal cross-check measure.

4. The method of claim 1, further comprising the steps of:
   calculating a control copy cross-check measure from the control copy of the variable data; and
   comparing the calculated control copy cross-check measure with the pre-transmittal cross-check measure.

5. The method of claim 1, wherein the pre-transmittal cross-check measure comprises a checksum.

6. The method of claim 1, further comprising the step of:
formatting at least the control copy of the variable data, thereby generating formatted control data.

7. The method of claim 1, further comprising the step of:
formatting at least the redundant copy of the variable data, thereby generating formatted redundant data.

8. The method of claim 6, further comprising the step of:
concatenating the pre-transmittal cross-check measure and the formatted control data.

9. An apparatus for transmitting dual-path variable data over a serial medium from a transmitter to a receiver within an automobile, the apparatus comprising:
means for generating a control copy and a redundant copy of the dual-path variable data at the transmitter;
means for calculating a pre-transmittal cross-check measure using the redundant copy of the dual-path variable data at the transmitter; and
means for generating a transmittal message at the transmitter using the control copy of the dual-path variable data and the pre-transmittal cross-check measure that was calculated using the redundant copy of the dual-path variable data; and
means for transmitting the transmittal message across the serial medium to the receiver.

10. The apparatus of claim 9, further comprising:
means for receiving a received message based at least in part on the transmitted transmittal message, the received message comprising a received data component and a received pre-transmittal cross-check measure.

11. The apparatus of claim 10, further comprising:
means for calculating a post-transmittal cross-check measure using the received data component; and
means for comparing the post-transmittal cross-check measure with the received pre-transmittal cross-check measure.

12. The apparatus of claim 9, further comprising:
means for calculating a control copy cross-check measure from the control copy of the dual-path variable data; and
means for comparing the control copy cross-check measure with the pre-transmittal cross-check measure.

13. The apparatus of claim 9, wherein the pre-transmittal cross-check measure comprises a checksum.

14. The apparatus of claim 9, further comprising:
means for formatting at least the control copy of the dual-path variable data, thereby generating formatted control data.

15. The apparatus of claim 9, further comprising:
means for formatting at least the redundant copy of the dual-path variable data, thereby generating formatted redundant data.

16. The apparatus of claim 14, further comprising:
means for concatenating the pre-transmittal cross-check measure and the formatted control data.

17. A system configured to process dual-path variable data using a serial communications medium within a vehicle, the system comprising:
a source of variable data; and
a transmitting processor coupled to the source of variable data and to the serial communications medium, wherein the transmitting processor is configured to receive the variable data from the source, to generate a control copy and a redundant copy of the variable data, to calculate a pre-transmittal cross-check measure based upon the redundant copy of the variable data, to generate a transmittal message comprising the control copy of the variable data and the pre-transmittal cross-check measure, and to transmit the transmittal message on the serial communications medium.

18. The system of claim 17 further comprising a receiving processor coupled to the serial communications medium, wherein the receiving processor is configured to receive the transmittal message from the transmitter, to separate the pre-transmittal cross-check measure from the variable data in the received transmittal message, to compute a post-transmittal cross-check measure, and to compare the post-transmittal cross-check measure with the received pre-transmittal cross-check measure to thereby verify the integrity of the variable data.

19. The system of claim 18 wherein the receiving processor is further configured to copy the received variable data, to compute the post-transmittal cross-check measure based upon the copy of the received variable data, and, after comparing the post-transmittal cross-check measure with the received pre-transmittal cross-check measure, to further compare a first set of variables extracted from the received variable data with a second set of variables extracted from the copy of the received variable data.

20. The system of claim 17 wherein the transmitting processor comprises a main processor and a sub-processor, wherein the main processor is configured to process one of the control copy and the redundant copy of the variable data, and a sub-processor configured to process the other of the control copy and the redundant copy of the variable data.

* * * * *